US012043154B2

(12) United States Patent
Dillinger

(10) Patent No.: US 12,043,154 B2
(45) Date of Patent: Jul. 23, 2024

(54) BACKREST FOR A VEHICLE SEAT

(71) Applicant: Adient US LLC, Plymouth, MI (US)

(72) Inventor: Thomas Dillinger, Ratingen (DE)

(73) Assignee: Adient US LLC, Plymouth, MI (US)

( * ) Notice: Subject to any disclaimer, the term of this patent is extended or adjusted under 35 U.S.C. 154(b) by 61 days.

(21) Appl. No.: 17/756,919

(22) PCT Filed: Dec. 10, 2020

(86) PCT No.: PCT/EP2020/085567
§ 371 (c)(1),
(2) Date: Jun. 6, 2022

(87) PCT Pub. No.: WO2021/116301
PCT Pub. Date: Jun. 17, 2021

(65) Prior Publication Data
US 2023/0001834 A1 Jan. 5, 2023

(30) Foreign Application Priority Data
Dec. 11, 2019 (DE) ...................... 10 2019 219 370.6

(51) Int. Cl.
*B60N 2/879* (2018.01)
*A47C 7/72* (2006.01)
*G10K 11/175* (2006.01)
*H04R 1/02* (2006.01)
*H04R 1/26* (2006.01)

(52) U.S. Cl.
CPC .............. *B60N 2/879* (2018.02); *A47C 7/727* (2018.08); *G10K 11/1752* (2020.05); *H04R 1/023* (2013.01); *H04R 1/025* (2013.01); *H04R 1/26* (2013.01); *H04R 2499/13* (2013.01)

(58) Field of Classification Search
CPC ............................... B60N 2/879; A47C 7/727
See application file for complete search history.

(56) References Cited

U.S. PATENT DOCUMENTS 4,042,791 A * 8/1977 Wiseman ............... H04R 5/023
5/904
4,490,842 A * 12/1984 Watanabe .............. B60N 2/803
381/86

(Continued)

FOREIGN PATENT DOCUMENTS

CN 2381206 Y * 6/2000
CN 110049901 A 7/2019

(Continued)

OTHER PUBLICATIONS

European Patent Office, International Search Report and Written Opinion in Application No. PCT/EP2020/085567, dated Feb. 26, 2021, 9 pages, Rijswijk, Netherlands.

*Primary Examiner* — Timothy J Brindley
(74) *Attorney, Agent, or Firm* — Marshall & Melhorn, LLC

(57) ABSTRACT

A backrest for a vehicle seat may have a backrest part, a head restraint part and an acoustic arrangement. The acoustic arrangement is arranged above the backrest part and may have at least one central loudspeaker and at least two side loudspeakers. The central loudspeaker may be built into the head restraint part and each of the at least two side loudspeakers may be arranged on a support. A vehicle seat with the backrest is also provided.

14 Claims, 3 Drawing Sheets

(56) References Cited

U.S. PATENT DOCUMENTS

| | | | |
|---|---|---|---|
| 6,893,094 B2 * | 5/2005 | O'Connor | A47C 7/383 |
| | | | 5/636 |
| 8,767,985 B2 | 7/2014 | Riopel | |
| 10,457,179 B1 * | 10/2019 | Kentley-Klay | B60N 2/879 |
| 11,052,801 B2 * | 7/2021 | Winton | H04R 1/026 |
| 11,178,488 B2 * | 11/2021 | Watanabe | H04R 1/345 |
| 11,285,853 B1 * | 3/2022 | Line | B60N 2/7005 |
| 2008/0292121 A1 | 11/2008 | Yotota | |
| 2018/0118063 A1 * | 5/2018 | Oswald | B60N 2/879 |
| 2018/0367901 A1 * | 12/2018 | Liljeroos | B60N 2/879 |
| 2019/0061561 A1 * | 2/2019 | Kondrad | B60N 2/22 |
| 2019/0232840 A1 * | 8/2019 | Close | B60N 2/885 |
| 2020/0128312 A1 * | 4/2020 | Christoph | H04R 3/12 |
| 2021/0377654 A1 * | 12/2021 | Oswald | H04R 1/345 |

FOREIGN PATENT DOCUMENTS

| | | | | |
|---|---|---|---|---|
| CN | 219467600 U * | 8/2023 | | |
| CN | 116724566 A * | 9/2023 | | B60N 2/879 |
| DE | 102016125741 A1 | 7/2017 | | |
| DE | 102019113265 A1 * | 3/2020 | | B60N 2/879 |
| EP | 3002152 A1 | 4/2016 | | |
| EP | 3072733 A1 | 9/2016 | | |
| EP | 3274215 B1 | 5/2019 | | |
| EP | 4275951 A1 * | 11/2023 | | |
| FR | 3114274 A1 * | 3/2022 | | |
| GB | 2224178 A | 4/1990 | | |
| WO | 2016022238 A1 | 2/2016 | | |
| WO | 2019121266 A1 | 6/2019 | | |
| WO | WO-2019145283 A1 * | 8/2019 | | B60N 2/879 |
| WO | WO-2021246069 A1 * | 12/2021 | | A47C 1/12 |
| WO | WO-2022084636 A1 * | 4/2022 | | B60N 2/879 |
| WO | WO-2023169026 A1 * | 9/2023 | | |

* cited by examiner

BACKREST FOR A VEHICLE SEAT

FIELD

The invention relates to a backrest for a vehicle seat, wherein the backrest comprises a backrest part, a head restraint part and an acoustic arrangement, wherein the acoustic arrangement is arranged above the backrest part and comprises at least one central loudspeaker and at least two side loudspeakers.

BACKGROUND

EP 3 274 215 B1 discloses a method for producing a head restraint having an integrated function module, wherein the function module is a loudspeaker unit.

WO 2019/121266 A1 discloses a dipole loudspeaker for a head restraint. The dipole loudspeaker is suitable for producing sound at base frequencies. The dipole loudspeaker has a diaphragm having a first radiating surface and a second radiating surface, wherein the first radiating surface and the second radiating surface are located on opposite sides of the diaphragm, and wherein the first and the second radiating surfaces each have a surface area of at least 100 cm$^2$. The dipole loudspeaker furthermore has a drive unit which is configured to move the diaphragm at base frequencies in such a manner that the first and the second radiating surface produce acoustic sound at base frequencies, wherein the acoustic sound produced by the first radiating surface is in antiphase with the acoustic sound produced by the second radiating surface.

SUMMARY

The problem addressed by the present invention is to provide a backrest for a vehicle seat having an extended integrated function and to improve backrests known from the prior art. Furthermore, a problem addressed by the invention is to provide a corresponding vehicle seat.

The problem is solved according to the invention by a backrest for a vehicle seat, wherein the backrest comprises a backrest part, a head restraint part and an acoustic arrangement, wherein the acoustic arrangement is arranged above the backrest part and comprises at least one central loudspeaker and at least two side loudspeakers, wherein the central loudspeaker is integrated in the head restraint part and the at least two side loudspeakers are arranged on a support.

Owing to the fact that the central loudspeaker is integrated in the head restraint part and the at least two side loudspeakers are arranged on a support, a spatially local region with a controlled sound and tone reproduction can be produced in the vicinity of the head, in particular in the vicinity of an ear region, of a user of the vehicle seat. The advantages obtained with the invention consist in particular in that an improved spatial sound and tone reproduction is made possible. By a transparent configuration of the support, a view for a user of the vehicle seat laterally and/or to the rear into the region surrounding the vehicle seat can continue to be possible.

The acoustic arrangement can comprise a control unit with a noise compensation and/or noise elimination function which is configured such that undesirable noises in the vicinity can be suppressed or can be faded out, for example, by frequency superimposition. As a result, in particular simple and effective noise compensation, in particular of road noises, is made possible.

The backrest part of the backrest can be a portion of the backrest reaching substantially as far as the height of a shoulder of a user of the vehicle seat. The head restraint part can be a head restraint which can be mounted, in particular releasably, on the backrest part of the backrest. The head restraint part can be fixedly connected to the backrest part. The head restraint part and the backrest part can be an integral part of the backrest.

For example, the control unit, in particular the noise compensation and/or noise elimination function thereof, is configured for occupants of the vehicle seat who are not drivers of the vehicle, in order to suppress or to extinguish all environmental noises, including driving and road noises and/or signals from emergency vehicles. For the driver, the control unit can be configured such that signals relevant to safety, such as signals from emergency vehicles, are not suppressed. Vehicle signals, for example status signals, in particular activated autonomous driving, vehicle at a standstill, break, parking or deactivated autonomous driving of the vehicle, can be supplied to the control unit such that, for example, the control unit can be used to also suppress substantially all environmental noises for the driver on taking into consideration the vehicle status, for example when autonomous driving is activated.

The control unit can be configured to take into consideration the position of the user of the vehicle seat, in particular the head of the user of the vehicle seat. For this purpose, the position of the head of the user in the region of the acoustic arrangement is detected and supplied to the control unit. For example, the noise compensation and/or noise elimination function can be configured so as, when it is identified that the user's head is in contact with the head restraint part, to substantially completely suppress the environmental noises and to output only desirable noises, such as music, via the acoustic arrangement. If, by contrast, the user's head is located at a distance from the head restraint part (for example is inclined forward), no environmental noises are then suppressed or faded out.

The support can be fastened to the head restraint part. The support can be fastened in the region of the head restraint part to the backrest. The support can be part of the head restraint part. The support can be elastic and/or flexible. A flexible design of the support ensures that the support is moved, in particular is bent and/or deformed, for example permanently bent or deformed, by an airbag triggered, for example, as a result of an impact or accident. Additionally or alternatively, an elastic design of the support permits a yielding and/or giving-way movement, in particular a temporary movement, of the support in the event of mechanical stressing, for example by a triggered airbag.

The support can have at least one bow, preferably two bows. The support can be configured to be transparent in portions. The support can surround open regions. The support can have transparent regions through which the user of the vehicle seat can look.

The support can be elastic and/or flexible. Preferably, at least one of the side loudspeakers is adjustable variably by the support in a position relative to the user's head. The two side loudspeakers can be adjustable variably by the support in a position relative to the user's head.

The support can be formed from an elastic and/or flexible material, in particular from a polymer material or spring steel. The polymer material can be a rubber-like polymer material, for example ethylene-propylene-diene rubber (called EPDM for short). The support can comprise a polymer material, in particular a rubber-like polymer material, for example ethylene-propylene-diene rubber (called EPDM for short), or a spring steel.

The support can have a casing made from a polymer material, in particular a soft polymer material. In particular, the spring steel can be encased by a polymer material, in particular a soft polymer material.

The acoustic arrangement, in particular the side loudspeakers, can be oriented in the direction of an ear region of a user of the vehicle seat. The acoustic arrangement can be arranged in the vicinity of an ear region of a user of the vehicle seat. At least one or more of the loudspeakers can be adjusted variably by the flexible support. This permits optimum positioning of the loudspeakers for the user and adaptation of the position of the loudspeakers to the user.

The support can protrude laterally from the head restraint part, in particular obliquely forward and outward. The two side loudspeakers can be arranged and held in a receiving opening of the support.

The two side loudspeakers can be mid-range loudspeakers. The two side loudspeakers can be tweeter loudspeakers. The two side loudspeakers can be combined mid-range and tweeter loudspeakers. The side loudspeakers can be arranged in such a manner that a directly radiating acoustic sound or an indirectly radiating acoustic sound radiates in the direction of ears of a user of the vehicle seat.

The central loudspeaker can be a low-frequency loudspeaker. The central loudspeaker can be covered by a cover element, in particular a padded cover element, or a separate padding element in the direction of a head support surface.

In summary, such an acoustic arrangement on a vehicle seat continues to permit a clear view and safe triggering of an airbag, such as a side airbag, located in the surrounding region.

A low-frequency loudspeaker is also known as a bass loudspeaker or woofer. The low-frequency loudspeaker can be designed as a boxless and open loudspeaker, in particular a diaphragm loudspeaker or wall-mounted loudspeaker. In particular, the low-frequency loudspeaker can be designed as an acoustic dipole or as a baffle loudspeaker. For example, a baffle or a diaphragm can be held in the head restraint part, in particular inside the head restraint part, on a head restraint support. The low-frequency loudspeaker is preferably arranged in the head restraint part in such a manner that a directly radiating acoustic sound or an indirectly radiating acoustic sound radiates in the direction of a head support surface on the head restraint part. The central loudspeaker can be covered here by an open covering, in particular a lattice structure, in the direction of the head support surface. The lattice structure can furthermore be surrounded by a cover element, in particular a padded cover element, or a separate padding element.

A mid-range loudspeaker is also known as a mid-range speaker. A tweeter loudspeaker is also known as a tweeter. The two side loudspeakers are arranged and held, for example, in a receiving opening of the support. For example, the side loudspeakers can be designed as a boxless and open loudspeaker, in particular a diaphragm loudspeaker or wall-mounted loudspeaker. In particular, the side loudspeaker can be designed as an acoustic dipole or a baffle loudspeaker. A baffle or a diaphragm can here be arranged and held in a receiving opening of a bow-shaped or wire-shaped support. The side loudspeakers are preferably arranged in such a manner that a directly radiating acoustic sound or an indirectly radiating acoustic sound radiates in the direction of ears of a user of the vehicle seat.

The side loudspeakers can be covered here by an open covering, in particular a lattice structure. The lattice structure can furthermore be surrounded by a cover element, in particular a padded cover element, or a separate padding element.

The support is in particular positioned and arranged on the vehicle seat in such a manner that the two side loudspeakers can be oriented relative to an ear region of a user of the vehicle seat. The flexible design of the support enables the latter to be set or positioned and held in a manner adapted to various user heights.

The abovementioned problem is also solved according to the invention by a vehicle seat having a backrest according to the preceding description.

In summary and described in other words, a boxless loudspeaker design can be used in a previously described backrest. An acoustic dipole can produce a near field sound cocoon. A central loudspeaker installed in a head restraint can be a boxless loudspeaker in the manner of a "bass cocoon" which is commercially available. The central loudspeaker is preferably located behind an occupant's head. At least two side loudspeakers, in particular two mid-range and tweeter loudspeakers, are located in the vicinity of the ears of the occupant and can be adaptable to the different occupant heights. The side loudspeakers are preferably attached to the vehicle seat or to the head restraint such that the peripheral view or view to the rear continues to be possible here. This can be made possible in particular by the use of transparent materials and/or of a design with open holders (e.g. holders of the side loudspeakers with a minimalistic design and/or use of a transparent material for the holders). The side loudspeakers are possibly located in a region in which what is referred to as a curtain airbag is triggered during a side impact. In order to reduce or to avoid a risk of injury during the use of a curtain airbag, the holder is preferably configured to be flexible (e.g. made from EPDM or spring steel).

DESCRIPTION OF THE FIGURES

The invention is explained in more detail below with reference to advantageous exemplary embodiments which are illustrated in the figures. However, the invention is not restricted to these exemplary embodiments. In the figures.

DETAILED DESCRIPTION

Figure 3:
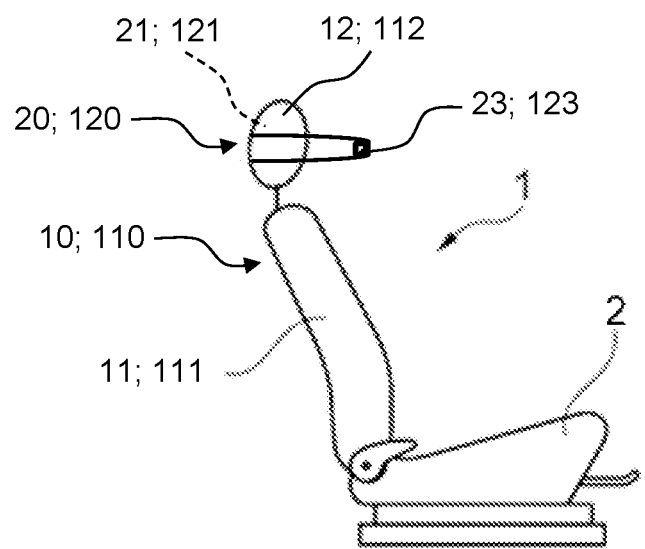
FIG. 3: schematically shows a vehicle seat according to the invention.

Position details and direction details which are used, for example front, rear, top and bottom, refer to a viewing direction of an occupant sitting on a vehicle seat 1 shown in FIG. 3 in a normal sitting position, wherein the vehicle seat 1 is installed in the vehicle, in a use position suitable for conveying a person with the backrest 10; 110 upright and is oriented as customary in the direction of travel. However, the vehicle seat 1 according to the invention can also be installed in a different orientation, for example transversely with respect to the direction of travel.

Figure 1:
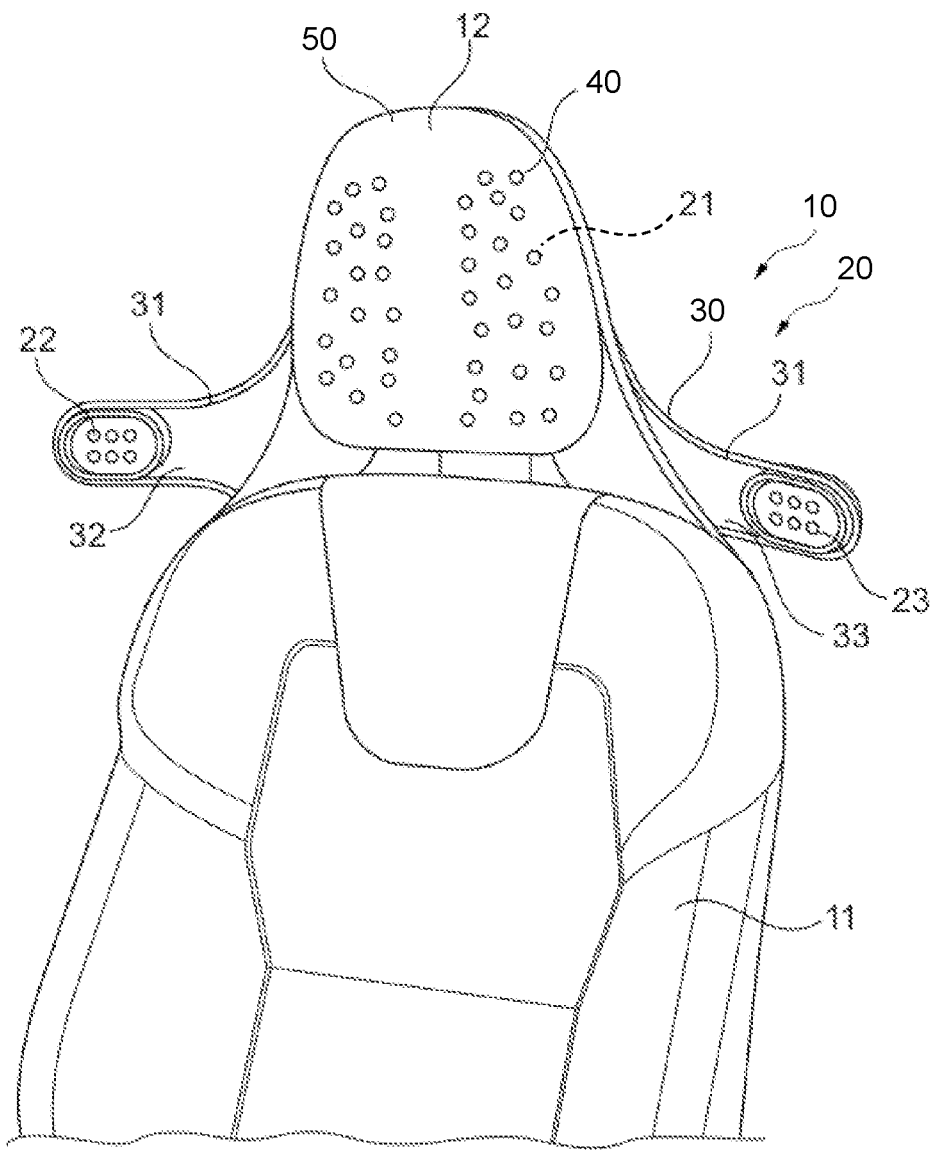
FIG. 1: schematically shows a perspective view obliquely from the front of a backrest according to the invention according to a first exemplary embodiment.

FIG. 1 shows a backrest 10 according to a first exemplary embodiment with an acoustic arrangement 20. The backrest 10 is for example an assembly of a vehicle seat 1 shown in FIG. 3.

The backrest 10 comprises a backrest part 11 and a head restraint part 12. The head restraint part 12 can here be held fixedly on the backrest part 11 by a head restraint support. In the present case, the head restraint supports are configured integrally with a backrest structure of the backrest part 11.

The acoustic arrangement 20 is arranged above the backrest part 11. The acoustic arrangement 20 comprises at least one central loudspeaker 21 and two side loudspeakers 22, 23.

The central loudspeaker 21 is integrated in the head restraint part 12. The two side loudspeakers 22, 23 are arranged on a support 30 which is at least partially transparent. The loudspeakers 21 to 23 can be wireless loudspeakers. Alternatively, corresponding cable lines can be guided in the support 30 or in other hollow support elements and can be connected to the loudspeakers 21 to 23.

The support 30 can be elastic and/or flexible. In particular, the support 30 can be moved, in particular can be bent and/or deformed, for example permanently bent or deformed, in the event of a mechanical stressing, for example during an adjustment movement and/or in the event of an impact by a triggered airbag. Alternatively or additionally, the support 30 can elastically yield or give way in the event of mechanical stressing.

The support 30 can be formed, for example, from a corresponding material, in particular from a polymer material, in particular a rubber-like polymer material, for example from ethylene-propylene-diene rubber (called EPDM for short), or from a spring steel. A spring steel can also be encased by a polymer material, in particular a soft polymer material. The polymer material is preferably transparent. In one possible embodiment, the acoustic arrangement 20 is arranged in the vicinity of an ear region of a user of the vehicle seat 1. Furthermore, at least one or more of the loudspeakers 22, 23 can be adjusted variably by the flexible support 30. This permits optimum positioning of the side loudspeakers 22, 23 for the user and adaptation of the position of the side loudspeakers 22, 23 to the user.

The support 30 is in the form of a bow 31. The support 30 extends, for example, above the backrest part 11 on either side laterally away from the head restraint part 12. In particular, the support 30 has two lateral bows 31 protruding laterally from the head restraint part 12.

The central loudspeaker 21 is, for example, a low-frequency loudspeaker. The central loudspeaker 21 is integrated in particular in the head restraint part 12. The central loudspeaker 21 is, for example, designed as a boxless and open loudspeaker, in particular diaphragm loudspeaker or wall-mounted loudspeaker. In particular, the central loudspeaker 21 is designed as an acoustic dipole or a baffle loudspeaker. For example, a baffle or a diaphragm is held in the head restraint part 12, in particular inside the latter on a head restraint support. The central loudspeaker 21 is arranged in the head restraint part 12 in such a manner that a directly radiating acoustic sound or an indirectly radiating acoustic sound radiates in the direction of a head support surface on the head restraint part 12.

The central loudspeaker 21 can additionally be covered in the direction of the head support surface by an open covering 40, in particular a lattice structure. The open covering 40 designed as a lattice structure can furthermore be surrounded by a cover element 50, in particular a padded cover element, or a separate padding element. The two side loudspeakers 22, 23 are, for example, combined mid-range and tweeter loudspeakers (also called mid-range and tweeter speakers). The two side loudspeakers 22, 23 are arranged and held, for example, in a receiving opening 32, 33 of the support 30.

Each of the side loudspeakers 22, 23 is preferably designed as a boxless and open loudspeaker, in particular diaphragm loudspeaker or wall-mounted loudspeaker. In particular, each of the side loudspeakers 22, 23 is designed as an acoustic dipole or a baffle loudspeaker. For example, a baffle or a diaphragm is arranged and held in the respective receiving opening 32, 33 of the support 30. The respective side loudspeaker 22, 23 is arranged in such a manner that a directly radiating acoustic sound or an indirectly radiating acoustic sound radiates in the direction of ears of the user of the vehicle seat 1. The respective side loudspeaker 22, 23 can additionally be covered in the direction of the head support surface by an open covering, in particular a lattice structure. The lattice structure can be surrounded by a cover element 50, in particular a padded cover element, or a separate padding element.

The support 30 is in particular positioned and arranged on the vehicle seat 1 in such a manner that the two side loudspeakers 32, 33 can be arranged in the ear region of the user of the vehicle seat 1. The flexible design of the support 30 enables the latter to be set or positioned and held in a manner adapted to various user heights.

Figure 2:
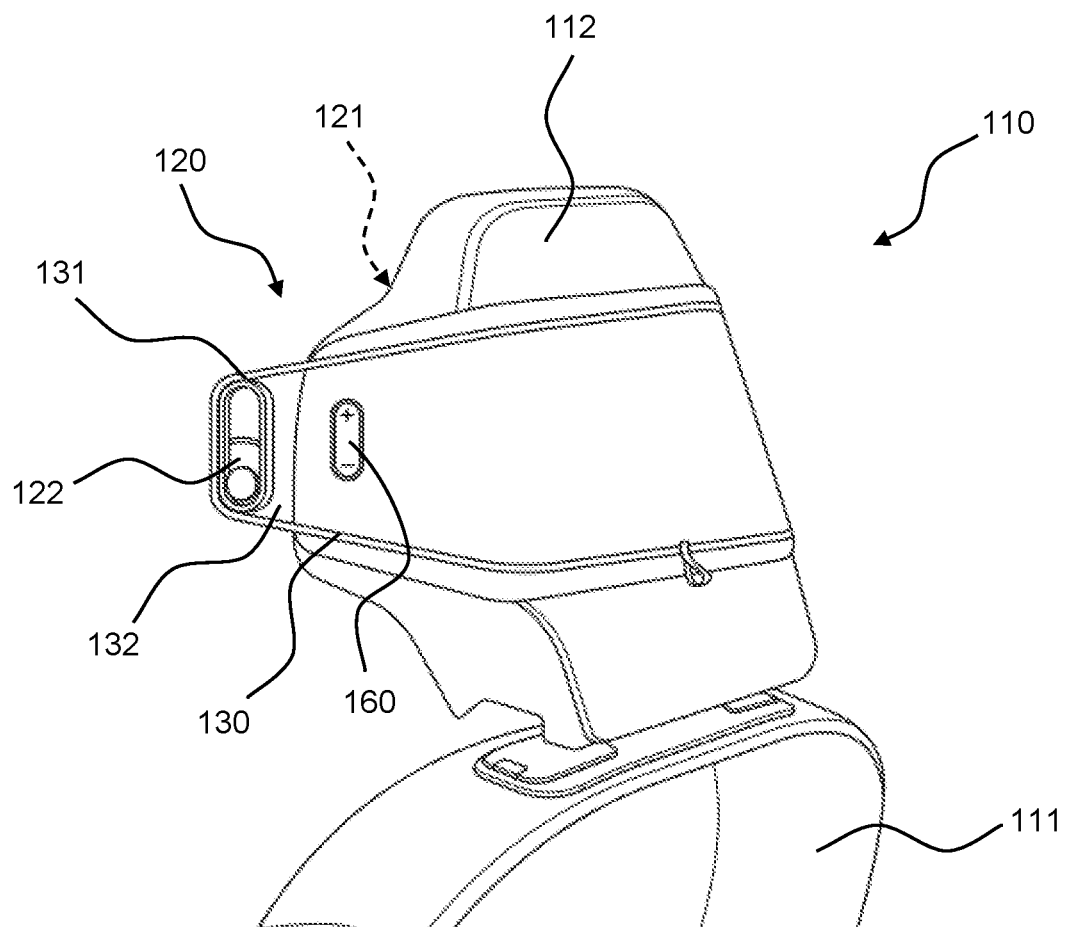
FIG. 2: schematically shows a perspective view obliquely from the rear of a backrest according to the invention according to a second exemplary embodiment.

FIG. 2 shows a backrest 110 of a second exemplary embodiment with an acoustic arrangement 120. The backrest 110 is, for example, an assembly of a vehicle seat 1 shown in FIG. 3.

The backrest 110 comprises a backrest part 111 and a head restraint part 112. In the present case, the head restraint part 112 is arranged in a height-adjustable manner on the backrest part 111. The head restraint part 112 can be held here on the backrest part 111 by a head restraint support, in particular in the form of head restraint rods.

The acoustic arrangement 120 is arranged above the backrest part 111. The acoustic arrangement 120 comprises at least one central loudspeaker 121. The acoustic arrangement 120 furthermore comprises two side loudspeakers 122, 123, of which only one side loudspeaker 122 is shown for illustrative reasons. The description below of the side loudspeaker 122 relates, unless explicitly described differently, likewise also to the second side loudspeaker 123, shown in FIG. 3.

The central loudspeaker 121 is integrated in the head restraint part 112. The side loudspeaker 122 is arranged on a support 130 which is designed in the form of a bow 131. The loudspeakers 121, 122 can be wireless loudspeakers. Alternatively, cable lines can be guided in the support 130 or in other hollow support elements and can be connected to the loudspeakers 121, 122.

The support 130 can be elastic and/or flexible. In particular, the support 130 can be moved, in particular bent and/or deformed, for example permanently bent or deformed, in the event of mechanical stressing, for example during an adjustment movement and/or in the event of an impact by a triggered airbag. Alternatively or additionally, the support 130 can elastically yield or give way in the event of mechanical stressing.

The support 130 is formed, for example, from a corresponding material, in particular from a polymer material, in particular a rubber-like polymer material, for example from ethylene-propylene-diene rubber (called EPDM for short), or from a spring steel. A spring steel can also be encased by a polymer material, in particular a soft polymer material. The polymer material is preferably transparent.

The acoustic arrangement 120 has a volume regulator 160 in a lateral region of the head restraint part 112 or of the support 130. The volume regulator 160 can be used to set a volume of a noise profile reproduced by the acoustic arrangement 120. The acoustic arrangement 120 is arranged in the vicinity of an ear region of a user of the vehicle seat 1. The side loudspeaker 122 can be adjustable variably by the flexible support 130. This permits optimum positioning of the side loudspeaker 122 for the user and an adaptation of the position of the side loudspeaker 122 to the user.

The support 130 extends, for example, above the backrest part 111 laterally away from the head restraint part 112. In particular, the support 130 is designed as a lateral bow 131 or wire bow to the side of the head restraint part 112. A region surrounded by the bow 131 is preferably configured to be transparent for the user of the vehicle seat 1. The user of the vehicle seat 1 is intended in particular to be able to look between the side loudspeaker 122 and the head restraint part 112 when looking over their own shoulder.

The central loudspeaker 121 is, for example, a low-frequency loudspeaker. The central loudspeaker 121 is integrated in particular in the head restraint part 112. The central loudspeaker 121 is designed, for example, as a boxless and open loudspeaker, in particular diaphragm loudspeaker or wall-mounted loudspeaker. In particular, the central loudspeaker 121 is designed as an acoustic dipole or a baffle loudspeaker. For example, a baffle or a diaphragm is held in the head restraint part 112, in particular inside the latter on a head restraint support. The central loudspeaker 121 is arranged in the head restraint part 112 in such a manner that a directly radiating acoustic sound or an indirectly radiating acoustic sound radiates in the direction of a head support surface on the head restraint part 112.

The side loudspeaker 112, in particular the two lateral loudspeakers 122, 123 are, for example, mid-range and tweeter loudspeakers (also called mid-range and tweeter speakers). The side loudspeaker 122 is arranged and held, for example, in a receiving opening 132 of the support 130. For example, the side loudspeaker 122 is designed as a boxless and open loudspeaker, in particular diaphragm loudspeaker or wall-mounted loudspeaker. In particular, the side loudspeaker 122 is designed as an acoustic dipole or a baffle loudspeaker. For example, a baffle or a diaphragm is arranged and held in the receiving opening 132 of the bow-shaped or wire-shaped support 130. The respective side loudspeaker 122 is arranged in such a manner that a directly radiating acoustic sound or an indirectly radiating acoustic sound radiates in the direction of ears of a user of the vehicle seat 1. The respective side loudspeaker 122 can additionally be covered here in the direction of the head support surface by an open covering, in particular a lattice structure.

FIG. 3 shows a vehicle seat 1 according to the invention. The vehicle seat 1 for a motor vehicle has a side part 2 and a backrest 10; 110 which is adjustable in its inclination relative to the seat part 2. The backrest 10; 110 can be mounted pivotably on the seat part 2 by a fitting in order to adjust an inclination of the backrest 10; 110. The backrest 10; 110 comprises a backrest part 11; 111 and a head restraint part 12; 112. An acoustic arrangement 20; 120 which comprises a central loudspeaker 21; 121 and at least two side loudspeakers 22, 23; 122, 123 is arranged above the backrest part 11; 111.

LIST OF REFERENCE SIGNS

1 Vehicle seat
2 Seat part
10; 110 Backrest
11; 111 Backrest part
12; 112 Head restraint part
20; 120 Acoustic arrangement
21; 121 Central loudspeaker
22; 122 Side loudspeaker
23; 123 Side loudspeaker
30; 130 Support
31; 131 Bow
32; 132 Receiving opening
33 Receiving opening
40 Covering
50 Cover element
160 Volume regulator

The invention claimed is:

1. A backrest for a vehicle seat, wherein the backrest comprises:
   a backrest part,
   a head restraint part and
   an acoustic arrangement, wherein the acoustic arrangement is arranged above the backrest part and comprises at least one central loudspeaker and at least two side loudspeakers,
   wherein the central loudspeaker is integrated in the head restraint part and the at least two side loudspeakers are arranged on a support,
   wherein the support comprises a polymer material comprising a rubber-like polymer material comprising ethylene-propylene-diene rubber, or spring steel.

2. The backrest as claimed in claim 1, wherein the acoustic arrangement comprises a control unit with a noise compensation and/or noise elimination function which is configured such that undesirable noises in the vicinity of the acoustic arrangement can be suppressed or can be faded out, for example, by frequency superimposition.

3. The backrest as claimed in claim 2, wherein the control unit is configured to take into consideration the position of the user of the vehicle seat, wherein the position of the user comprises the position of the head of the user of the vehicle seat.

4. The backrest as claimed in claim 1, wherein the support has at least one bow.

5. The backrest as claimed in claim 1, wherein the support is elastic and/or flexible.

6. The backrest as claimed in claim 1, wherein at least one of the two side loudspeakers can be adjusted by the support in a position relative to a user's head.

7. The backrest as claimed in claim 1, wherein the acoustic arrangement comprising the side loudspeakers, is oriented in the direction of an ear region of a user of the vehicle seat.

8. The backrest as claimed in claim 1, wherein the support protrudes on either side of the head restraint part, wherein the protrusion is obliquely forward and outward.

9. The backrest as claimed in claim 1, wherein the two side loudspeakers are arranged and held in a respective receiving opening of the support.

10. The backrest as claimed in claim 1, wherein the two side loudspeakers are combined mid-range and tweeter loudspeakers.

11. The backrest as claimed in claim 1, wherein the side loudspeakers are arranged in such a manner that a directly radiating acoustic sound or an indirectly radiating acoustic sound is oriented in the direction of ears of a user of the vehicle seat.

12. The backrest as claimed in claim 1, wherein the central loudspeaker is a low-frequency loudspeaker.

13. The backrest as claimed in claim 1, wherein the central loudspeaker is covered by a cover element, the cover element comprising a padded cover element, or a separate padding element in the direction of a head support surface.

14. A vehicle seat, having the backrest as claimed in claim 1.

\* \* \* \* \*